United States Patent

Boyne

[15] 3,690,623

[45] Sept. 12, 1972

[54] TWIN SCREW EXTRUSION PRESSES

[72] Inventor: Ivor Fenwick Boyne, West Ewell, England

[73] Assignee: GKN Windsor Limited

[22] Filed: May 26, 1970

[21] Appl. No.: 40,620

[30] Foreign Application Priority Data

June 11, 1969  Great Britain..........29,696/69

[52] U.S. Cl.................................259/192, 425/207
[51] Int. Cl. ...................................B29f 3/02
[58] Field of Search.18/12 SB, 12 SP, 12 SM, 12 SR, 18/12 SC, 12 SE, 30 SM, 30 SQ, 2 EP, 2 EM, 2 ES

[56] References Cited

UNITED STATES PATENTS

| | | | |
|---|---|---|---|
| 3,252,182 | 5/1966 | Colombo................. | 18/12 SP |
| 2,631,016 | 3/1953 | Laubarede............ | 18/12 SP X |
| 3,421,182 | 1/1969 | Colombo........... | 18/12 SB UX |
| 2,705,343 | 4/1955 | Hendry.............. | 18/12 SB UX |
| 2,946,089 | 7/1960 | Heston................... | 18/12 SM |
| 3,239,882 | 3/1966 | Yokana.................... | 18/12 SR |
| 2,896,253 | 7/1959 | Mol......................... | 18/12 SB |
| 3,509,601 | 5/1970 | Johannson........... | 18/12 SA X |

FOREIGN PATENTS OR APPLICATIONS

| | | | |
|---|---|---|---|
| 1,000,373 | 8/1965 | Great Britain........... | 18/125 E |

Primary Examiner—J. Spencer Overholser
Assistant Examiner—Michael O. Sutton
Attorney—Holcombe, Wetherill & Brisebois

[57] ABSTRACT

The invention consists in providing in a twin-screw injection or extrusion machine for moulding plastics material, a flow control means located between successive sections and/or at the forward end of the screws and comprising intermeshing flanged members each having a plurality of radial parallel flanges and each of said flanges having a plurality of circumferentially spaced gaps forming flow paths for the plastics material, said flanged members being rotatably adjustable relative to each other to vary the relative angular positions of the gaps in adjacent flanges thereby to vary the cross-sectional area or the course of said flow paths.

7 Claims, 9 Drawing Figures 3,690,623

TWIN SCREW EXTRUSION PRESSES

This invention relates to means for controlling the flow of thermoplastic or thermoset material (hereinafter referred to as plastics material) in a machine for the extrusion, injection or processing of plastics material and more particularly in a machine of the kind comprising intermeshing twin screws rotatable in a barrel for the plasticizing or processing of said plastics materials, and feeding said materials to a die or outlet nozzle at the front end of said barrel.

In an extrusion or injection moulding machine the form of the screws in the barrel varies according to the nature of the plastics material, and the degree to which the plastics material is to be plasticized or otherwise processed.

The disadvantage of known constructions of twin screw machines is that, when it is required to change from one specific plastics material to another it is often necessary to dismantle the barrel and screws and change to screws or screw sections of a different construction.

The object of the present invention is to overcome this disadvantage and to provide an improved construction of intermeshing twin screw machine provided with flow control means capable of being adjusted to regulate the flow of plastics material according to the nature of the plastics material used and to control the degree of plasticizing or processing of the said material over a wide viscosity range, thereby eliminating the need for replacing or modifying the screws.

With the above stated object in view the machine according to the present invention comprises intermeshing twin screws mounted for rotation in a barrel, wherein flow control means are provided between successive sections and/or at the forward end of said screws, said flow control means comprising intermeshing twin flanged-members rotatable with said screws and each having a plurality of axially spaced radial flanges and each of said flanges having a plurality of circumferentially spaced gaps or openings forming flow paths for the plastics material, said intermeshing twin flanged-members being rotatably adjustable relative to each other to vary the positions of the gaps or openings in the flanges of one flanged-member relative to the positions of the gaps or openings in flanges of the other flanged-member.

In order that the invention may be more clearly understood, embodiments of a machine incorporating flow control means according to the invention will now be described, by way of example, with reference to the accompanying drawings, in which.

Figure 1:
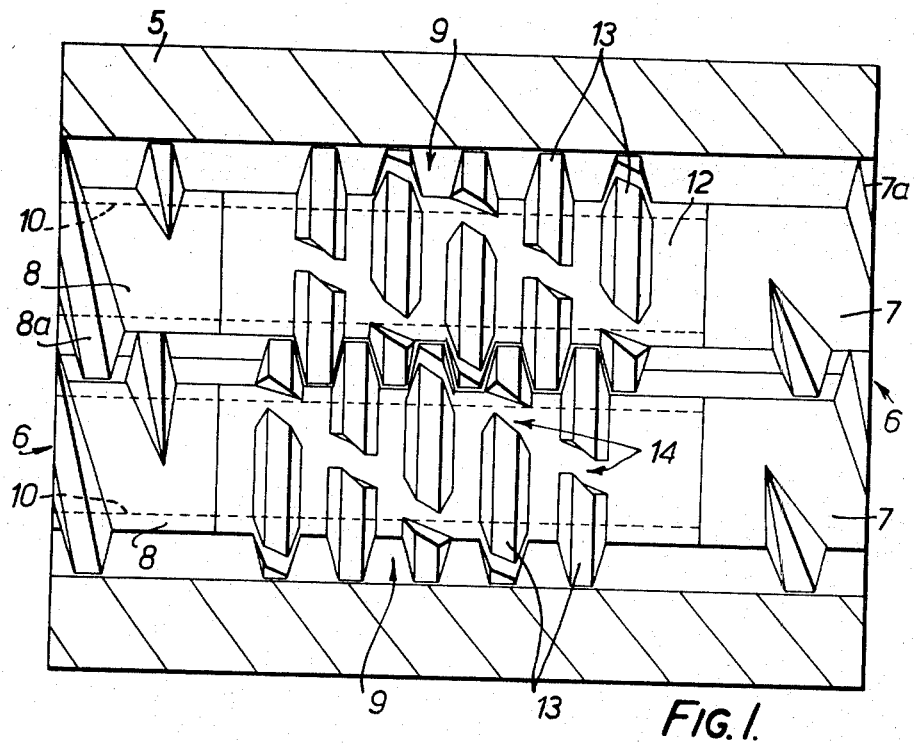
FIG. 1 is a sectional view of the barrel of a twin-screw machine having flow control means according to the invention mounted therein.

Referring to FIGS. 1 to 4A of these drawings the screw extruder comprises a barrel 5 in which closely intermeshing twin screws, indicated generally at 6, are mounted so as to be rotatable therein. In the embodiment shown each screw comprises a number of separate sections, of which two sections 7 and 8 only are shown, and the flow control means comprises intermeshing twin flanged-members indicated generally at 9 located between the sections 7 and 8 of the screws and arranged to be rotated with said screws. Each of the flanged or flow control members 9 and at least the forward screw section 8 of each screw are removably coupled to each other and to the screw section 7 by a splined coupling comprising a central splined shaft 10 which may be integral with the rear screw section 7. The removable screw section 8 and the flow control flanged-member 9 are hollow and provided internally with key-ways 11 (FIG. 3) in which the splines on the splined shaft 10 engage to prevent rotation of said screw section 8 and flow control flanged-member 9 relative to said shaft 10.

Figure 2:
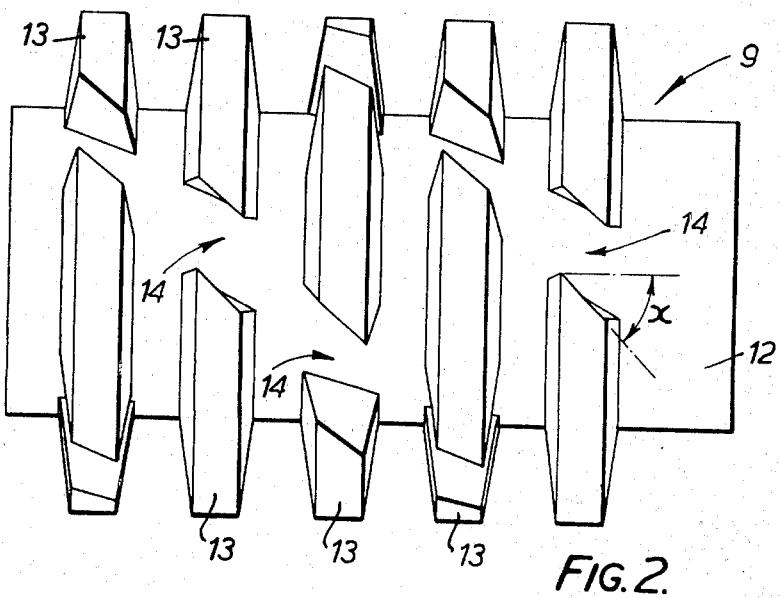
FIG. 2 is a side elevation of one member of the flow control means according to the invention.
Figure 3:
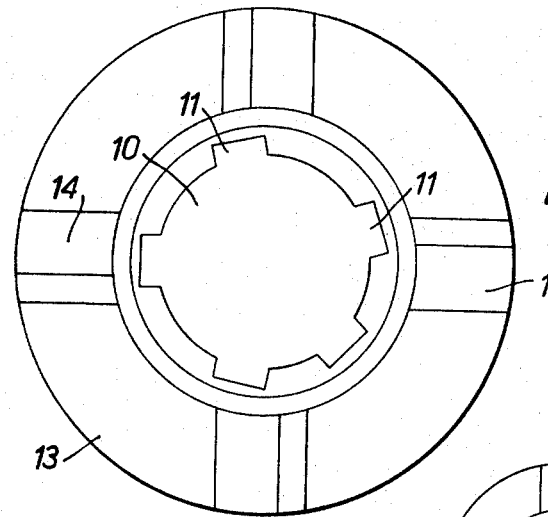
FIG. 3 is an end view of FIG. 2.
Figures 4, 4A:
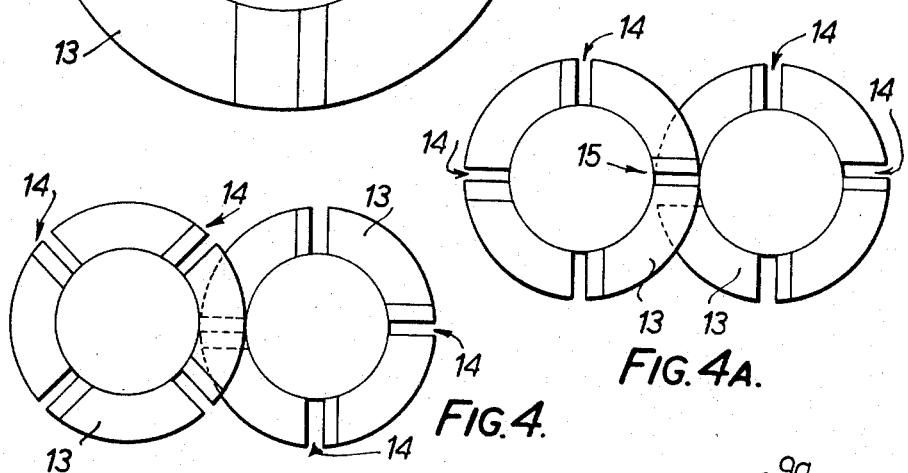
FIGS. 4 and 4A are diagrammatic views illustrating the method of adjusting the flow control means according to the invention.

Referring now to FIGS. 2 and 3, each flanged-member 9 of the flow control means according to the invention comprises a sleeve portion 12 provided with axially extending internal key-ways 11, as above described, and around its outer cylindrical surface is provided with a plurality of integral flanges 13 extending radially outwards from said sleeve portion 12 parallel to each other and equally spaced axially of said sleeve portion 12. The flanges 13 have a cross-section corresponding substantially to the cross-section of the flights 7a, 8a of the screw section 7 and 8 and are each provided with a plurality of circumferentially spaced gaps or openings 14. In the present embodiment, each flange 13 is provided with four gaps or openings 14 equally spaced circumferentially around the flange portion as shown in FIGS. 4 and 4A. The gaps or openings of adjacent flanges 13 are arranged in staggered relationship, that is, the gaps or openings of one flange are off-set or displaced angularly relative to the gaps or openings of adjacent flanges, in such a manner that the gaps or openings of all the flanges together provide helical flow paths for the plastics material, as clearly indicated in FIGS. 1 and 2.

As illustrated in FIG. 1 a flow control flanged-member 9 shown in FIG. 2 is mounted on each of the shafts 10 of the twin screws with the parallel flanges 13 intermeshing.

In the arrangement illustrated in FIG. 1 the flow control flanged-members 9 of the flow control means are in phase, when the invention is applied to a machine in which the screws rotate in the same direction, that is they are so arranged that during rotation of the flanged-members the gaps or openings 14 in the flanges thereof move successively into register with the gaps or openings in the flanges of the other flanged-member at the intermeshing parts of the flanges 13 and thus provide open helical flow channels or paths, as shown in FIGS. 1 and 4A, through which plastics material can flow relatively freely from the rear feed screws 7 to the forward screws 8. This arrangement of the flow control flanged-members 9, that is the arrangement in which said control members are in phase, is illustrated in FIG. 4A so that during rotation of the control member the gaps or openings in the flanges 14 thereof successively move into register, as shown at 15 in FIG. 4A, so that helical flow paths or channels having a cross-sectional area corresponding to the cross-sectional area of each gap or opening 14 are formed to permit a relatively free flow of plastics material from the rear screw sections 7 to the forward screw sections 8 of the intermeshing twin screws.

The relative arrangement of the flow control flanged-members, as above described, whilst being suitable for the processing of certain plastics materials, may not be suitable for processing other forms of plastics material. Thus, if it is desired to regulate the flow control means for processing a different form of plastics material in which the material must be fed from the rear screws 7 to the forward screws 8 under greater pressure, the intermeshing flanged members can be slid off the shaft 10 and replaced in different relative rotary positions whereby the gaps or openings 14 in said flanges 13 of one flow control flanged member do not register exactly with the gaps or openings in the flanges of the other flow control flanged-member during rotation, but overlap, so as to reduce the cross-sectional area of the helical flow paths or channel thus formed. In certain circumstances, and with certain plastics materials, it may be desirable to arrange the intermeshing flanged control members in such relative position that the gaps or openings in the flanges do not register at all during rotation of said flanged members, that is in an out-of-phase position as illustrated in FIG. 4, so that the plastics material is forced to follow a tortuous path from the screw sections 7 to the screw sections 8.

Figure 5:
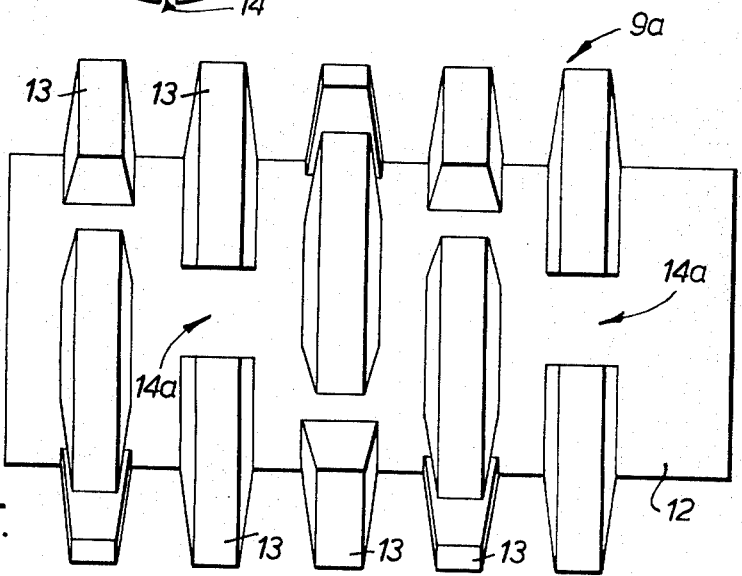
FIG. 5 is a view similar to FIG. 2 of a modified form of one member of the flow control means according to the invention.

In the embodiment of flow control means illustrated in FIGS. 1 to 4A the gaps or openings 14 in the flanges 13 are cut at an angle $x$ (FIG. 2) to the axis of the flanged control member thereby providing a smooth unrestricted helical flow path for the plastics material. With some plastics material, however, a more restricted flow path is desirable, in order to increase the pressure, and this can be achieved by cutting the gaps or openings in the flanged-member 9a parallel to the axis of the flanged control member as shown at 14a in FIG. 5.

Figure 6:
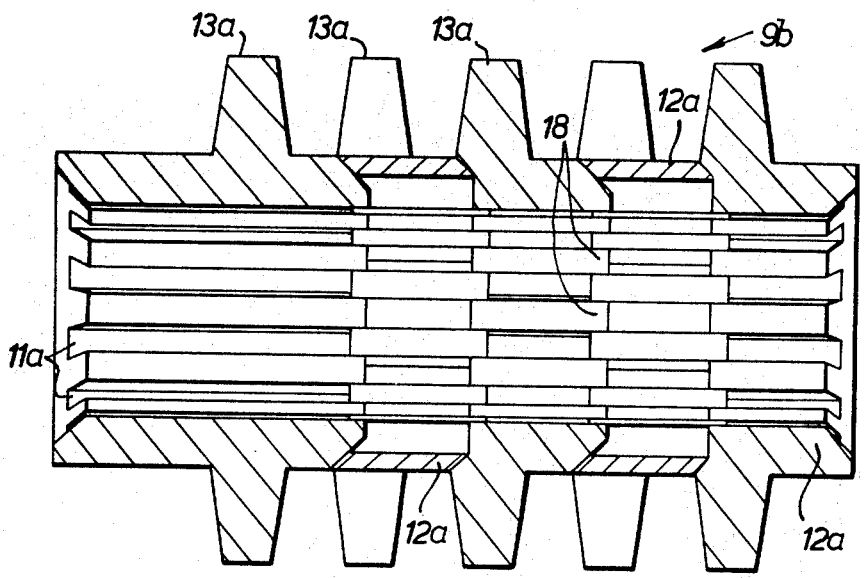
FIG. 6 is an axial section through a still further modification of one member of flow control means according to the invention.
Figure 7:
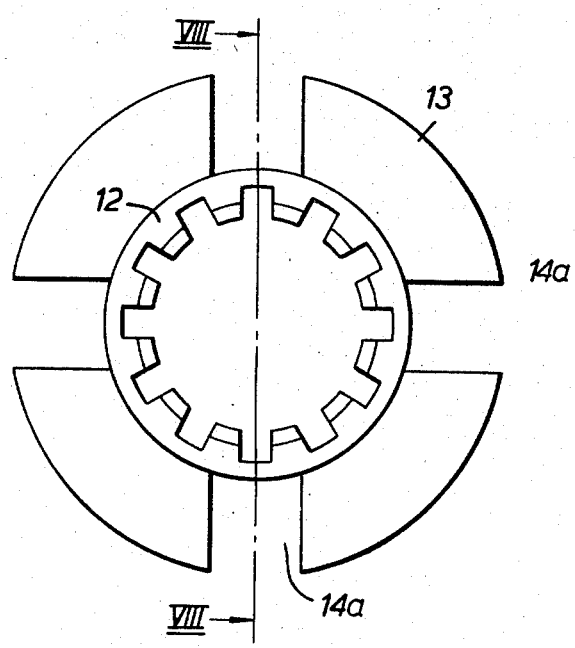
FIG. 7 is an end elevation of FIG. 6.

Referring now to FIGS. 6 and 7, in a modified construction of flow control means according to the invention each of the flanged-members is composed of a plurality of interengaging coaxial elements or sections as shown more clearly in FIG. 6. Each of said elements or sections comprises a cylindrical or hollow sleeve portion 12a having a single outwardly directed flange 13a. In the embodiment shown said flange 13a is provided with four gaps or openings 14a arranged at equally spaced intervals circumferentially of the flange and each of said gaps or openings is cut parallel to the axis of the flanged member, as in FIG. 5, but may be cut at an angle to the axis of the flanged element or section, as in the embodiment according to FIGS. 1 to 4A.

Each of said flanged elements or sections is provided with internal axially extending key-ways 11a, as in the previously described embodiment, whereby the end elements or sections of the flow control member can be removably mounted on a splined shaft of a screw of the machine. Each of said elements or sections is provided on one side with an external tapered or bevelled outer annular surface 16 and on the opposite side with an internal tapered or bevelled annular surface 17 such that when a plurality of said flanged elements or sections are assembled to form a complete flow control member as illustrated in FIG. 6, the external tapered or bevelled surface 16 of one element or section mates with the internal tapered or bevelled surface of an adjacent flanged element or section. On the side of the flanged element or section provided with an external tapered or bevelled surface 16 said element or section is provided with a plurality of circumferentially spaced outwardly extending projections or dogs 18 which, in the assembled state of the flow control member shown in FIG. 6, extend into and engage in the key-ways 11a of an adjacent flanged element or section to prevent relative rotation therebetween during operation of the machine while permitting said flanged elements or sections to be easily dismantled and re-assembled in different relative rotary positions to vary the positions of the gaps or openings in one flanged element or section relative to the gaps or openings in an adjacent flanged element or section and thus vary or adjust the form of the flow paths formed by said gaps or openings as required for any particular plastics material.

It will thus be understood that with this embodiment not only can two intermeshing flanged-members be rotatably adjusted relative to each other but the individual elements or sections of each flange member are relatively adjustable.

Figure 8:
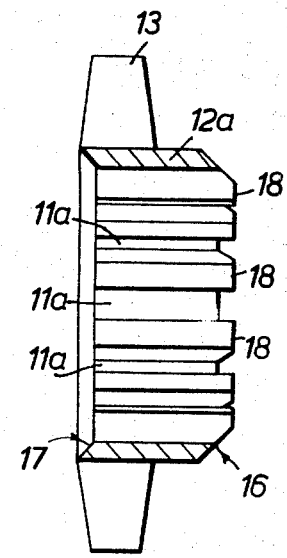
FIG. 8 is a section on the line VIII—VIII of FIG. 7.

A flow control means according to the embodiment illustrated in FIGS. 6 to 8 has the advantage that not only can the direction of the flow paths for the plastics material be varied as required by varying the relative rotary positions of adjacent flanged elements or sections but the length of said flow paths can be varied by varying the number of flanged elements or sections used for any particular assembled flow control means.

With an extrusion or injection machine according to the invention an aperture may be provided in the barrel in advance of one or more of the intermeshing flow control members to allow the discharge of gases from or the introduction of additives into said barrel.

It must be understood that the invention is not limited to the particular embodiment herein described but may be modified in various ways without departing from the scope of the invention. For example, more or fewer than four gaps 14 may be provided in the flanged portion 13 of the flow control flanged-members 9, 9a. Furthermore, the intermeshing flow control flanged-members need not necessarily be arranged between two successive intermeshing screw sections but may in certain circumstances be arranged in advance of the forwardmost screw sections. Also, more than one intermeshing flow control member may be provided between sections of the screws.

It must also be understood that the individual flanged elements or sections in the embodiment of FIGS. 6 to 8 may if desired be provided with more than one flange.

The advantages of the invention as described for the extrusion machine in this specification can equally be applied to the injection machine or other plastics processing machines, and the addition of the described flow control means to intermeshing screws on such machines, and on injection machines in particular, increases the plasticizing or processing capacity of the said machines due to the controlled rise in temperature of the plastics material, which takes place over the length of the flow control means.

It must also be understood that the invention is not limited to the particular details of construction herein described. For example the flow control means may be coupled to the screws in any suitable manner. In a modified construction the shaft of each screw is provided with a single key-way and the hollow sleeve portion of each flanged member is provided with a plurality of internal splines, the flanged members being locked against rotation relative to said shaft by a suitable locking key.

I claim:

1. A machine for the extrusion or injection of plastics material comprising at least one pair of intermeshing twin screws rotatably mounted about parallel axes within a barrel, wherein flow control means are provided at the forward end of at least one pair of screws, said flow control means comprising intermeshing twin flanged-members rotatable with said screws and each having a plurality of axially spaced radial flanges and each of said flanges having a plurality of circumferentially spaced gaps forming flow paths for the plastics material, said flanged-members being removably coupled to said twin screws by splined couplings to permit individual adjustment of the angular position of at least one of said intermeshing twin flanged-members relative to its axis of rotation so as to vary the positions of the gaps in the flanges of said at least one flanged-member relative to the positions of the gaps in the flanges of the other flanged-member, each of said flanged-members comprising a hollow sleeve portion provided with axially extending internal keyways which engage splines formed on a splined shaft rigidly secured to the corresponding screw.

2. A machine for the extrusion or injection of plastics material comprising at least one pair of intermeshing twin screws rotatably mounted about parallel axes within a barrel, wherein flow control means are provided at the forward end of at least one pair of screws, said flow control means comprising intermeshing twin flanged-members rotatable with said screws and each having a plurality of axially spaced radial flanges and each of said flanges having a plurality of circumferentially spaced gaps forming flow paths for the plastics material, and means for individually adjusting the angular position of at least one of said intermeshing twin flanged-members relative to its axis of rotation and thereby varying the positions of the gaps in the flanges of said at least one flanged-member relative to the positions of the gaps in the flanges of the other flanged-member, each of said flanged-members being composed of a plurality of interengaging coaxial flanged elements rotatably adjustable relative to each other, with each of said flanged elements comprising a sleeved portion having a single outwardly directed radial flange and being provided with axially extending internal keyways.

3. A machine according to claim 2, wherein each of said flanged elements is provided on one side with an external bevelled surface and with a plurality of circumferentially spaced outwardly extending projections and on the other side with an internal bevelled surface, whereby the external bevelled surface of one flanged element mates with the internal bevelled surface of an adjacent flanged element and the outwardly extending projections engage in the key-ways of an adjacent flanged element when the flow control member is assembled.

4. A machine according to claim 3, wherein the gaps in the flanges of the flow control flanged-member are cut at an angle to the axis of said flow control member.

5. A machine according to claim 3, wherein the gaps or openings in the flanges of the flow control flanged-member are cut parallel to the axis of said flow control member.

6. A machine according to claim 2, wherein the circumferentially spaced gaps of adjacent flanges of each flanged-member are arranged in staggered relationship in such a manner that the gaps of all flanges together provide helical flow paths for the plastics material, and the gaps of each flange of each of said flanged-members are equally spaced circumferentially around said flange.

7. A machine according to claim 1 wherein a pair of intermeshing screws located in advance of the flow control means is coupled to a pair of intermeshing screws behind said flow control means by said splined shaft.

* * * * *